United States Patent [19]
Caselani et al.

[11] 3,973,551
[45] Aug. 10, 1976

[54] POWERED CIRCULATION OVEN

[75] Inventors: Richard E. Caselani, Ashland; John W. Gilliom, Mansfield; Robert H. McFarland, Mansfield; Richard L. Perl, Mansfield, all of Ohio

[73] Assignee: The Tappan Company, Mansfield, Ohio

[22] Filed: Nov. 3, 1972

[21] Appl. No.: 303,325

[52] U.S. Cl. .............................................. 126/21 A
[51] Int. Cl.² ..................... A21B 1/26; F24C 15/32
[58] Field of Search ...................... 126/21 A, 21, 19

[56] References Cited
UNITED STATES PATENTS

| | | | |
|---|---|---|---|
| 2,524,272 | 10/1950 | Sage | 126/19 R |
| 3,384,068 | 5/1968 | Perry et al. | 126/21 A |
| 3,587,557 | 6/1971 | Henderson | 126/21 A |
| 3,590,803 | 7/1971 | Sauer | 126/21 A |

FOREIGN PATENTS OR APPLICATIONS

| 603,460 | 1/1926 | France | 126/21 A |
|---|---|---|---|

Primary Examiner—William F. O'Dea
Assistant Examiner—Harold Joyce
Attorney, Agent, or Firm—Donnelly, Maky, Renner & Otto

[57] ABSTRACT

The oven cooking cavity has a perforated top wall above which there is a substantially full width plenum chamber which receives from a rear exterior duct heated air and gases under pressure for discharge of the same downwardly through the cavity top substantially uniformly over the area of the same. The heated air and gases exit from the cavity at the bottom and comingle with newly heated air and gases from a bottom forward gas burner in passage therewith to motor-driven impeller means which discharges into the delivery duct. In such gas embodiment, a small portion of the circulation within the cavity is vented to the atmosphere at the top front of the oven and compensating make-up room air supplied. The heat source can also be electric, with full instead of substantially full recirculation as in the gas embodiment.

10 Claims, 4 Drawing Figures

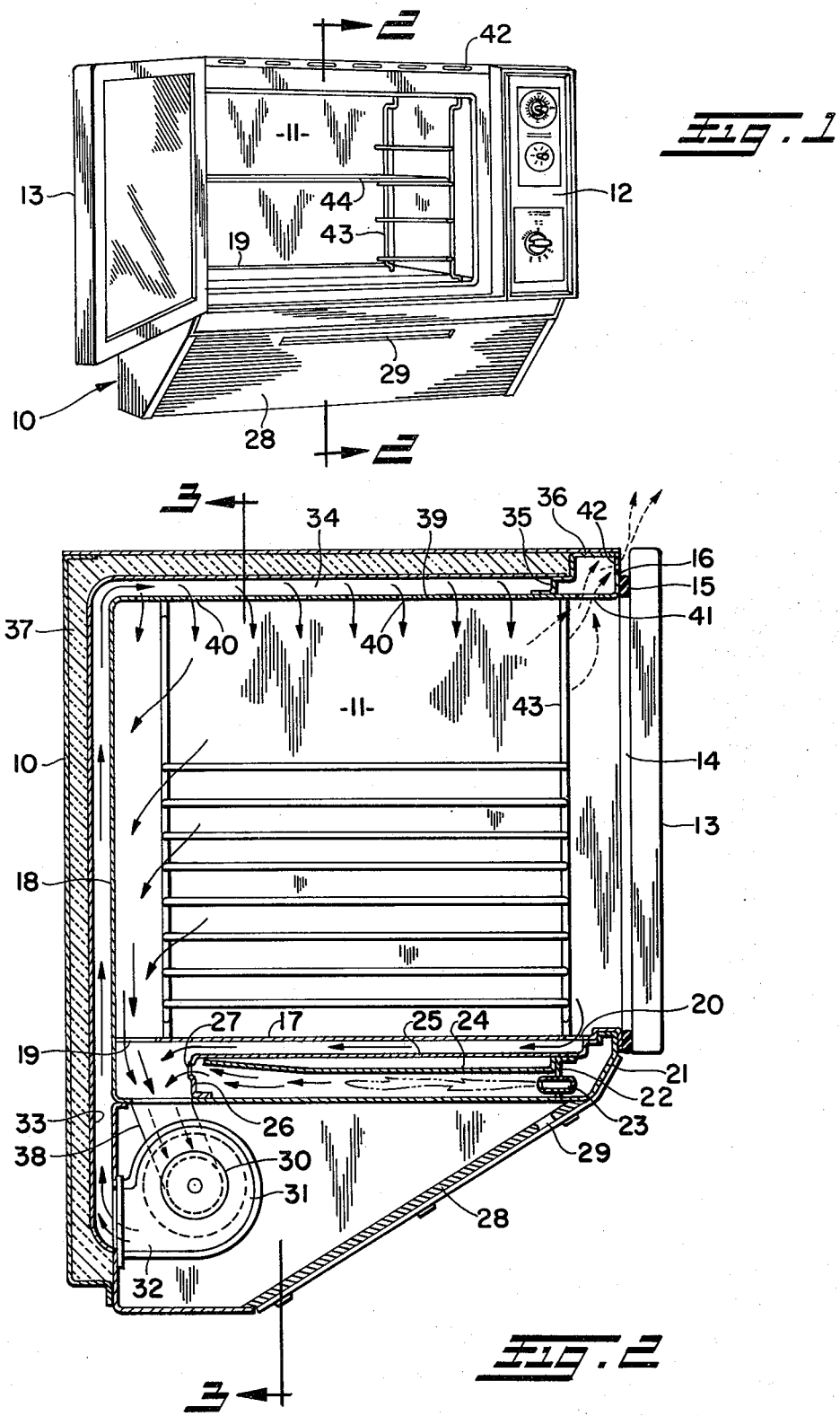

POWERED CIRCULATION OVEN

This invention relates, as indicated, to a cooking oven in which there is a controlled circulation of heated air and gases under pressure for cooking or heating of different foods according to their respective requirements, as contrasted to the use of radiant and/or natural convection air currents in conventional ovens.

The idea of using hot air or gases as the heating medium in a cooking oven has been of interest for many years, and some patents have issued on particular configurations of powered ovens for the purpose. For example, U.S. Pat. No. 2,582,887 purports to be an improvement over the still earlier type of muffle oven by recirculating air out of and into the oven and through the same, while heating the air at some exterior location in the particular flow path produced. The patent recognizes the problem that has probably accounted for the fact that this form of oven has not been successful to date, namely, the lack of uniform heating of all foods, essential for good results, and it is not believed that the particular mechanical design it discloses is in fact an acceptable solution. More particularly, the patent teaches withdrawing the air by means of a fan through perforations in the back wall of the oven cavity and discharging the air upwardly in heat transfer relation to a flue wall heated to high temperature and then forwardly across the top exterior of the oven to a front opening for discharge into the same.

The high flue temperature needed in such heat exchange section and such generally downward discharge into the cavity from a narrow top front opening appear to be limitations precluding efficient operation of the oven, especially for cooking all foods which must be within the performance capability of a household oven, for example. The arrangement is believed inherently to have a tendency to apply appreciably more heat to the food at the front, and broiling in particular should present special problems on this account.

Another approach is proposed in U.S. Pat. No. 3,074,393 in which an extremely turbulent state of heated air movement within the oven is intended and provided. Such turbulance would almost certainly be disturbed by the unavoidably variable nature, size and shape of the food to be cooked, and it seems inevitable that spattering would be substantially increased, especially in broiling. Moreover, it is thought highly doubtful that all surfaces of the food would be uniformly exposed to the heating medium, so that again it is not believed that this further proposal, or the modification thereof shown in U.S. Pat. No. 3,118,436, can provide satisfactory teachings for a full range cooking oven.

A primary object of the present invention is to provide yet another form of powered circulation oven which has not only solved the problems noted in the foregoing, but has even bettered conventional ovens as to performance in several respects.

The most impressive advantage of the new oven, as evidenced by extensive testing, is its ability to perform all of the usual oven cooking operations in the home, for example, in much shorter times than normally required in conventional ovens, with an over-all time reduction average on the order of about 45 per cent. Moreover, the quality of the cooked food has surprisingly been considerably improved, probably due at least partially to the noted substantial reduction in the time needed for proper cooking.

These advantages of the new oven result from providing therein a particular type of controlled air flow, largely recirculated, and it is immaterial whether the heat source be of gas or electric type.

Another notable advantage is realized particularly in broiling, and that is the reduction of spatter, which not only obviously reduces dirtying the oven, but is also a factor in enhancing the quality of the food by containment of the natural juices within the meat products being broiled.

The heated air is preferably directed downwardly from the top of the cooking cavity substantially uniformly over the area of the same, and it is this action that provides the desired uniformity of the heating, reduction of spatter, the retention of natural juices and moisture, and the further ability by ordinary racking of foods at different levels to cook an entire meal at the same time.

Other objects and advantages of the present invention will become apparent as the following description proceeds.

To the accomplishment of the foregoing and related ends the invention, then, comprises the features hereinafter fully described and particularly pointed out in the claims, the following description and the annexed drawings setting forth in detail a certain illustrative embodiment of the invention, this being indicative, however, of but one of the various ways in which the principle of the invention may be employed.

In said annexed drawings:

FIG. 1 is a perspective view of an oven in accordance with the present invention with its door ajar;

FIG. 2 is a transverse sectional view of such oven the plane of which is indicated by the line 2—2 in FIG. 1;

Figure 3:
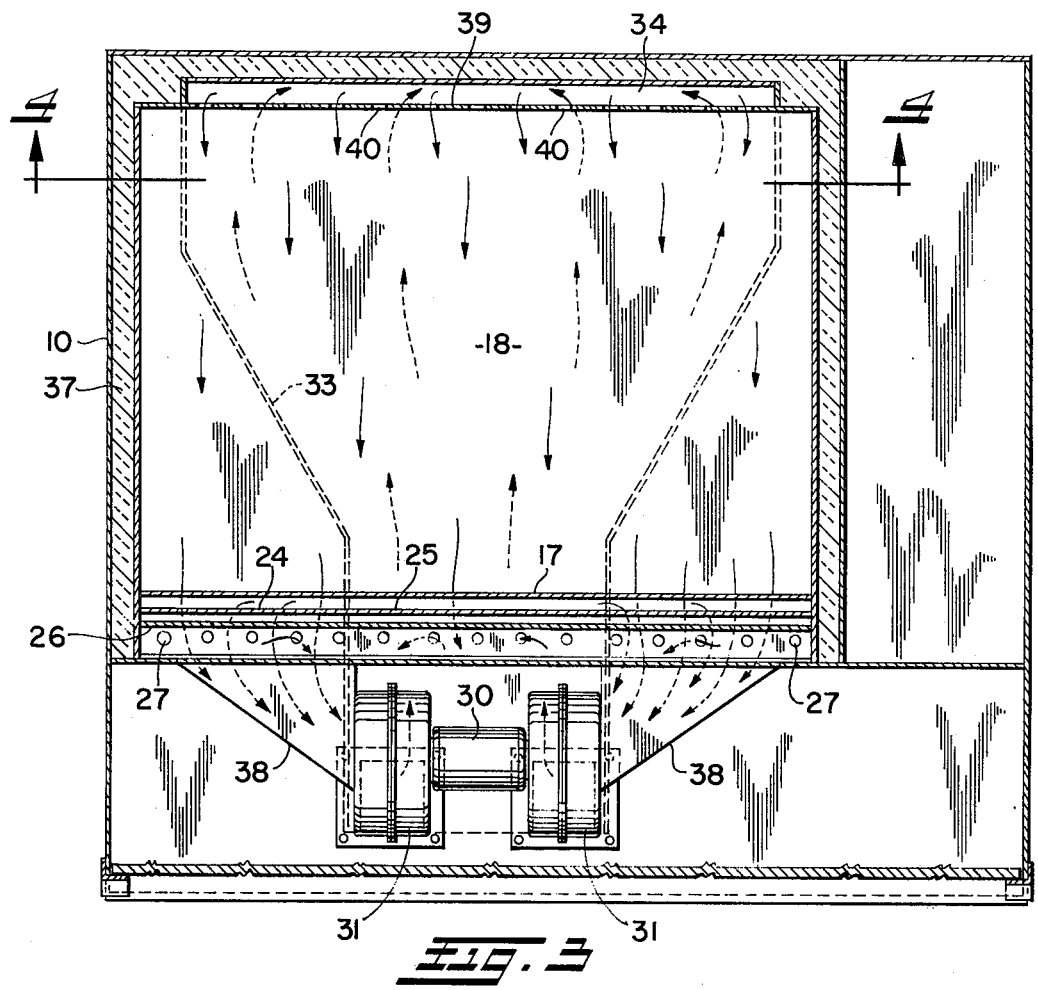
FIG. 3 is a further sectional view substantially at right angles and at the generally indicated plane of the line 3—3 in FIG. 2.

Referring now to the drawings more in detail, the new oven comprises an enclosure 10 containing the oven cavity 11 and, at the right of the same, a vertical control panel section 12 in which various conventional controls for regulating the operation of the oven as desired are housed. This oven is shown with a swinging door 13 hinged at the left which cooperates with a sealing gasket 14 about the front opening of the oven, with the upper part 15 of the gasket being spaced, as shown most clearly in FIG. 2, an appreciable distance below the upper edge of the front oven flange 16 for a purpose to be later described. The bottom wall 17 of the oven cavity does not extend fully to the rear wall 18 and thereby defines a continuous slot 19 at the bottom rear of the cavity. This bottom wall 17 also has a series of longitudinal slots 20 across its width near the front where it is supported by an upturned and rebent liner flange 21.

A transverse flanged piece 22 supports an elongated gas burner 23 just behind the first-mentioned flange, and there is, in respective spaced relation, above the same a baffle 24 and a burner box top wall 25. The rear wall 26 of such box is provided with a plurality of rearwardly flanged holes 27, and burner 23 has its ports spaced along its inner side, so that the flame when combustion occurs is directed rearwardly as shown by the interrupted lines in FIG. 2 beneath baffle 24.

Below the cooking cavity, within the lower part of the enclosure which has a rearwardly sloped front wall 28 and an elongated slot 29 therein, there is contained a motor and blower assembly comprising in this embodiment an electric motor 30 having horizontal drive shaft extensions at both ends which respectively operate centrifugal blowers 31. The outlets 32 of the blowers commonly discharge into a vertical duct 33 which extends upwardly over the rear wall 18 of the oven to a top plenum chamber 34 extending forwardly but not fully to the front of the oven. Such plenum chamber is closed at the front by a formed transverse piece 35 secured at its upper flange 36 to the outer enclosure 10, the space therein about the cavity, duct and the plenum chamber being filled with glass wool 37 or equivalent thermal insulating material.

Figure 4:
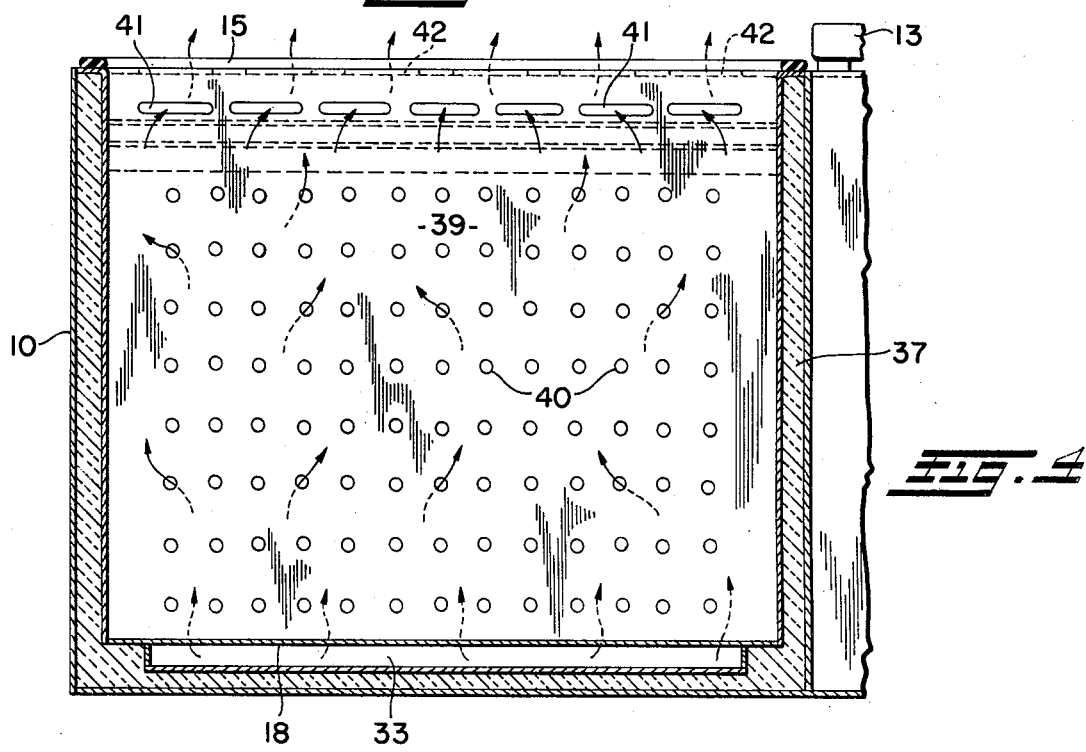
FIG. 4 is a horizontal section showing in plan the top of the oven cavity as indicated by the section line 4—4 in FIG. 3.

Inlet ducts 38 of generally triangular shape as viewed from the front in FIG. 3 communicate with the bottom slot 19 and the central or eye inlets of the blowers 31, while the top wall 39 of the oven cavity is formed with a series of uniformly spaced holes 40, referring in particular to FIG. 4, extending substantially over the area of the top and also with a forward series of aligned slots 41 adjacent the top front liner flange 16, the latter having slots 42 likewise therein above the top course 15 of the door-sealing gasket.

The oven cavity is, as previously indicated, provided with suitable rack supports 43 at its respective sides to receive and support horizontal racks at different elevations, one of which is indicated at 44.

With regard now to the operation of the illustrated gas oven embodiment of the invention, the forwardly located gas burner 23 is supplied in the usual manner with a combustible mixture of gas and primary air and controllably ignited, preferably by electric ignition means, not shown. As will also be understood to workers skilled in the art, the operation of the burner will be under manual and settable automatic control, the latter being responsive to temperature within the oven to perform the desired cooking operation, from either a cold start or with a preheat feature. The inlet 29 in the sloped front of the bottom portion of the housing or burner box section admits secondary and also a certain amount of make-up room air. The combustion products are rearwardly directed below baffle 24 to the rear holes 27 in the wall 26 and into the ducts 38 leading respectively to the inlets of the blowers 31, which can be of squirrel case impeller type. The hot gases are impelled at a speed of about 1050 to 1400 feet per minute by the blowers upwardly through the rear vertical duct 33, which, as shown in FIG. 3 especially, increases in width to join the substantially full oven width top chamber 34. From this chamber the gases are downwardly discharged into the cavity through top holes 40 and, after passing through the cavity, are drawn from the same through the rear bottom slot 19 and front slots 20 for recirculation as indicated by the arrows and comingling with the combustion products issuing from the burner. A certain proportion of the hot gases is permitted to escape through the top forward slots 41, the void thereabove, and out the uppermost front slots 42 above the top gasket length 15 for discharge to the room. The amount of heated air and gases thus vented is balanced by the amount of make-up room air provided by the lower housing slot 29. The pressured circulation through the cavity is thus downward, against food supported in or on utensils on an oven rack or racks.

As indicated earlier, electric resistance heater means, not shown, can be used as well as the gas burner illustrated with the same powered circulation of the heated air through the oven, although with this electric alternative, the oven can operate with full recirculation, that is, without venting any portion and any provision for compensating intake of make-up room air. In both versions, the oven can be successfully operated with a heat source providing approximately 25,000 BTU/hr., the rating being dependent on the cavity size.

It is preferred that the temperature generally not exceed approximately 475°F, especially where the use is such that undesirable smoke would result at higher temperatures.

Some examples of cooking tests, performed according to high standards of quality, will serve to illustrate the aforementioned efficiency of the new oven. As such an example, in baking refrigerated biscuits, with a total of 18 on a rack-supported tray or trays, good even heat distribution and cooking were realized in 6 to 7 minutes from a cold start to an oven temperature of 475°, as compared to the standard directions for cooking the same by preheating the oven to that temperature and baking for 8 to 10 minutes. No top burning was evident and good browning of the bottoms resulted. Another test involved baking frozen chicken pot pies, with the operation performed at a temperature of 475°F in a time of 25 minutes, as compared to the standard instruction in this case for preheating the oven to a temperature of 425°F and then maintaining such temperature for 40 minutes. Similarly, with respect to broiling meats, from a cold start, a halved chicken normally requiring 20 minutes of exposure on one side and successive turnings for intervals of 15 and 20 minutes, was broiled in the new oven at a temperature of 500°F for 25 minutes, with extremely good results evidenced by the lack of burning, a golden brown exterior, and sealing of the flavor and the juices within the meat. The standard baking of a potato for approximately 1 hour at about 400°F was performed in 30 minutes at 500°F, with a crisp outer skin produced and soft inside at a temperature of 190°F. A refrigerated package of scalloped chicken and noodles, the standard directions of which call for cooking by preheating the oven to 400°F and baking for about 40 minutes was accomplished with good browning in 15 minutes at 500°F.

These are just a few of very numerous tests which have been performed on all types of foods and cooking operations, with an over-all time reduction average, as compared to the standard recommended, on the order of about 45 per cent as earlier noted and, also important, the added advantage of improvement in the appearance and the quality of food. Rack positioning or elevation within the cavity is of course significant and will vary as determined by such testing to produce optimum results for particular foods.

It will also be obvious to those skilled in the art, that the oven should be equipped with an interlock between the door and the blower motor, to cut off the latter and hence the circulation whenever the door is opened during operation for any reason to preclude user exposure to the pressurized hot gas flow. In the gas version illustrated, in which there is partial venting, the exhaust of hot vapors and gases to the room is relatively slight and the kitchen, for example, accordingly receives only a small amount of such heat input due to operation of the oven. This is even further minimized when an electric heat source is used with full recirculation as described in the above.

It will further be appreciated that exploding fat globules in broiling are contained and in fact forcibly directed back against the food by the downflow of the hot gases against the same, so that the oven in this sense is cleaner in operation. If desired, it can be equipped for self-cleaning by incorporating therein the known and widely used expedients for pyrolytic cleaning or continuous self-cleaning, as desired, with both not only technically familiar to workers in the art but functionally known to housewives as being commercially available for several years.

The discussed substantial reduction in cooking time, as compared to what has been standard, should make the new oven of particular interest and advantage to restaurant operators for quicker cooking to order selected individual meals, where such has been the custom, and permitting wider use of the practice.

A single impeller of the indicated capacity could obviously be used in lieu of the two shown, in either horizontal or vertical axis orientation, and, if the oven is electrically heated, it could be to advantage for ready access to place the heating element or elements within the rear duct.

We claim:

1. A powered circulation oven, comprising a cavity having a rear wall, side walls, a bottom wall, a top wall, and a front door, the top wall being provided with a series of openings therethrough spaced uniformly over the cooking area, the bottom wall having outlet means to the space therebeneath, blower means having inlet communication with said bottom outlet means, a gas burner beneath the front portion of the cavity bottom wall downstream of the blower means for supplying heated air and gases to the same together with the gases flowing from the bottom wall outlet means, means for delivering the output of said blower means to the space above the cavity wall for pressurized flow thereof downwardly through the cavity and recirculation by the blower means, the cavity top wall having a further series of vent openings adjacent its front edge for venting a minor portion of the heated air and gases within the cavity to the room, and a sealing gasket interposed between the cavity front and the door when closed, with vent openings in the former above the gasket for communication with the top wall forward vent openings.

2. An oven as set forth in claim 1, wherein the burner is contained in a firebox having means for admittance of secondary and make-up air from the room to the blower inlet.

3. An oven as set forth in claim 1, wherein the blower means is located beneath the rear portion of the bottom wall of the cavity, and the heated air and gases from the burner are directed rearwardly for comingling with the air withdrawn from the cavity bottom as directed to the blower means.

4. An oven as set forth in claim 1, wherein said means for delivering the output of said blower means to the space above the cavity wall extends vertically against the cavity rear wall to the top plenum chamber.

5. A powered circulation oven having a cooking cavity, a heat source located outside of said cavity and having a directional output, blower means likewise located outside the cavity, means for directing such output from said heat source to the intake side of said blower means, means for directing the output of said blower means to the exterior top of the cavity and discharging the same substantially fully through such top substantially uniformly over the full area of the same, means for withdrawing substantially all of the air and vapors from the cavity at the bottom thereof, and means for directing the thus withdrawn air and gases likewise to the intake side of the blower means for recirculation thereby through the cavity along a path that at least in part coincides with that of the heat energy output of the heat source ahead of the blower, whereby the recirculated air and gases from the cavity are exposed to such heat energy ahead of the blower for consumption of grease particles and the like in the thus withdrawn air and gases for consumption of the same prior to recirculation through the oven cavity.

6. An oven as set forth in claim 5, wherein a minor portion of the recirculating air and gases within the cavity is vented directly therefrom to the atmosphere.

7. An oven as set forth in claim 5, wherein the heat source is gas burner means to which a mixture of gaseous fuel and primary air is supplied for combustion, with the flame produced by the burner thus directed toward the intake side of the blower means for mixing with the recirculated air and gases withdrawn from the cavity and such consumption of grease particles and the like in the same.

8. An oven as set forth in claim 7, wherein the blower means positively draws secondary air from without the oven to the burner means.

9. An oven as set forth in claim 5, wherein the output of the blower means is directed by duct means over the rear wall of the cavity to the top of the latter for such discharge into the same.

10. An oven as set forth in claim 5, wherein the heat source is gas burner means located in the space beneath the bottom front of the cavity for ready access thereto.

* * * * *

UNITED STATES PATENT OFFICE
CERTIFICATE OF CORRECTION

PATENT NO. : 3,973,551
DATED : August 10, 1976
INVENTOR(S) : Richard E. Casciani et al It is certified that error appears in the above-identified patent and that said Letters Patent are hereby corrected as shown below:

On the cover page of the patent, the name "Caselani et al" should read --Casciani et al--; also, the first named inventor, "Richard E. Caselani" should read --Richard E. Casciani--.

Signed and Sealed this

Twenty-third Day of November 1976

[SEAL]

Attest:

RUTH C. MASON
*Attesting Officer*

C. MARSHALL DANN
*Commissioner of Patents and Trademarks*